(12) United States Patent
Lei et al.

(10) Patent No.: US 12,180,351 B2
(45) Date of Patent: *Dec. 31, 2024

(54) CONDENSATE OF POLY/MONO-PHOSPHOROUS ACID AND ALUMINUM HYDROGEN PHOSPHATE, PREPARATION AND APPLICATION THEREOF

(71) Applicants: JIANGSU LISIDE NEW MATERIAL CO., LTD., Taizhou (CN); ZHEJIANG UNIVERSITY, Hangzhou (CN)

(72) Inventors: Hua Lei, Hangzhou (CN); Jinzhong Li, Taizhou (CN)

(73) Assignees: JIANGSU LISIDE NEW MATERIAL CO., LTD., Taizhou (CN); ZHEJIANG UNIVERSITY, Hangzhou (CN)

( * ) Notice: Subject to any disclaimer, the term of this patent is extended or adjusted under 35 U.S.C. 154(b) by 575 days.

This patent is subject to a terminal disclaimer.

(21) Appl. No.: 17/607,838

(22) PCT Filed: Feb. 4, 2021

(86) PCT No.: PCT/CN2021/075177
§ 371 (c)(1),
(2) Date: Oct. 29, 2021

(87) PCT Pub. No.: WO2022/077813
PCT Pub. Date: Apr. 21, 2022

(65) Prior Publication Data
US 2023/0257549 A1 Aug. 17, 2023

(30) Foreign Application Priority Data
Oct. 12, 2020 (CN) .......................... 202011084985.2

(51) Int. Cl.
C08K 3/32 (2006.01)
C08K 7/14 (2006.01)
C08L 77/06 (2006.01)

(52) U.S. Cl.
CPC .................. *C08K 3/32* (2013.01); *C08K 7/14* (2013.01); *C08L 77/06* (2013.01); C08K 2003/329 (2013.01); C08L 2201/02 (2013.01)

(58) Field of Classification Search
CPC ...... C08K 3/32; C08K 7/14; C08K 2003/329; C08L 77/06; C08L 2201/02
See application file for complete search history.

(56) References Cited

U.S. PATENT DOCUMENTS

| 3,310,503 A | 3/1967 | Huwyler et al. |
| 2015/0040800 A1* | 2/2015 | Gane .................... C08K 5/5317 162/181.2 |

FOREIGN PATENT DOCUMENTS

| CN | 1546371 | 11/2004 |
| CN | 104114485 | 10/2014 |
| CN | 109181293 | 1/2019 |
| CN | 109467751 | 3/2019 |
| CN | 111116988 | 5/2020 |
| GB | 665174 | 1/1952 |

* cited by examiner

*Primary Examiner* — John E Uselding
(74) *Attorney, Agent, or Firm* — Jiwen Chen; Joywin IP Law PLLC

(57) ABSTRACT

The present invention discloses a crystalline aluminum phosphite, preparation and an application thereof. The compound has the following structural formula (I):

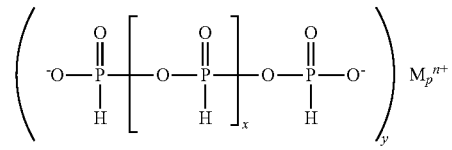

where, x is an integer of 1-6; n, y and p are an integer of 1-4; M is Ca, Mg, Al, Zn, Fe, Sn or Ti. The preparation method includes: after dissolving phosphorous acid and hydrogen phosphite into water, adding concentrated phosphoric acid for reaction at 80-90° C., then performing drying at low temperature, dehydration reaction at high temperature, washing and drying. The compound has very high thermal decomposition temperature, high phosphorus content, and good flame retardant property, low water absorption and low acidity; moreover, the compound can serve as a halogen-free flame retardant component of high polymer materials.

11 Claims, No Drawings

CONDENSATE OF POLY/MONO-PHOSPHOROUS ACID AND ALUMINUM HYDROGEN PHOSPHATE, PREPARATION AND APPLICATION THEREOF

This is a U.S. national stage application of PCT Application No. PCT/CN2021/075177 under 35 U.S.C. 371, filed Feb. 4, 2021 in Chinese, claiming priority to Chinese Patent Applications No. 202011084985.2, filed Oct. 12, 2020, all of which are hereby incorporated by reference.

TECHNICAL FIELD

The present invention relates to the technical field of new materials, and in particular to a condensate of poly/mono-phosphorous acid and aluminum hydrogen phosphate, preparation and an application thereof.

BACKGROUND

Phosphorous acid has a higher phosphorus content, and may serve as a flame retardant or a flame retardant synergist, but has defects as well; that is, phosphorous acid has strong acidity and water solubility, thereby causing the degradation of high polymer materials, equipment corrosion and migration precipitation. These problems limit the use of phosphorous acid as a flame retardant. Salts based on phosphorous acid include hydrogen phosphites and phosphites. Similar to phosphorous acid, the strong acidity and water solubility of hydrogen phosphite limit its use as a flame retardant; phosphites of some special metal ions, e.g., aluminum phosphite, avoid the defects of phosphorous acid due to greatly decreased acidity and water solubility, and thus can be used as a flame retardant or flame retardant synergist, for example, synergy with diethyl phosphinic aluminum (DEPA1) may be applied in a glass fiber reinforced nylon system to possess better flame retardance (e.g., patented technology No. CN107936297A or CN107760023A). But there are still shortcomings in phosphite; such as, phosphite has low phosphorus content, certain solubility and still has certain water absorption and acidity; and these characteristics will also influence the application thereof as a flame retardant.

SUMMARY OF INVENTION

Directed to the problems of the existing phosphite, such as, decreased flame retardant property, water absorption and acidity as well as the shortcomings in the prior art, the present invention provides a condensate of poly/mono-phosphorous acid and aluminum hydrogen phosphite; the compound has a higher phosphorus content and lower water absorption, and may be compounded with diethyl phosphinic salt; moreover, the compound has good flame retardance, lower acidity and water absorption and thus, is an ideal compound to substitute phosphite to be synergistic with diethyl phosphinic aluminum.

A condensate of poly/mono-phosphorous acid and aluminum hydrogen phosphite has the following structural formula (I):

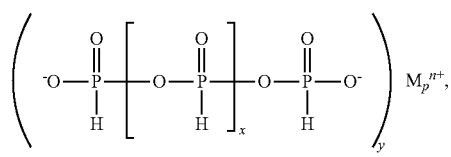

where, x is an integer of 1-6; n, y and p are an integer of 1-4; M is Ca, Mg, Al, Zn, Fe, Sn or Ti.

It is surprisingly found that the condensate of poly/mono-phosphorous acid and aluminum hydrogen phosphite of the present invention may be used as a synergist for the inflaming retarding of high polymer materials. The flame retardant synergist may be synergistic with other flame retardants to greatly improve the flame retardant efficiency. Usually, the flame retardant synergist and flame retardant are mixed with a polymer to be flame-retarded together with other polymer additives through kneading and extrusion, thus forming flame-retardant polymer composites. The machining process is performed at a higher temperature, and the polymer exists in a melting form at such a temperature and the temperature may exceed 320° C. in a short time. The flame retardant synergist must be able to tolerate the temperature and thus, cannot be decomposed. It has been surprisingly found that the condensate of poly/mono-phosphorous acid and aluminum hydrogen phosphite of the present invention has good heat stability (high thermal decomposition temperature) and lower water absorption and acidity.

Preferably, M is Al or Ca, and p is 1 or 2.

Preferably, x is 1 or 2.

Preferably, the condensate of poly/mono-phosphorous acid and aluminum hydrogen phosphite has a particle size of 0.1-1000 μm, a water solubility of 0.01-10 g/L, a bulk density of 80-800 g/L, and a water content not greater than 5 wt %, further preferably, a water content of 0.1 wt %-5 wt %.

The condensate of poly/mono-phosphorous acid and aluminum hydrogen phosphite of the present invention may not be obtained by a conventional synthesis method.

The present invention provides a preparation method of the condensate of poly/mono-phosphorous acid and aluminum hydrogen phosphite, including the following steps:

(1) dissolving phosphorous acid and a metal M salt of hydrogen phosphite, as a reactant, into water, then adding concentrated phosphoric acid ($H_3PO_4$) being 1%-5% of the mass of the reactant and having a concentration not less than 85 wt %, and performing stirring evenly for reaction at 80-90° C., wherein M is Ca, Mg, Al, Zn, Fe, Sn or Ti;

(2) drying the material obtained in the step (1) until a water content of the material falls below 0.3 wt %, wherein the drying temperature is controlled to be below 150° C.;

(3) performing dehydration reaction on the dried product obtained in the step (2) in an inert atmosphere or under vacuum conditions at 200-300° C., and terminating the dehydration reaction when a temperature corresponding to a thermal weight loss of 2 wt % of the product is greater than 400° C., and performing cooling to room temperature and performing discharging to obtain a solid;

(4) washing the solid obtained in the step (3) with water until washing effluent has a conductivity less than 50 μs/cm, drying the washed product until the product has a water content less than 0.3 wt %, thereby obtaining the condensate of poly/mono-phosphorous acid and aluminum hydrogen phosphite.

M is Ca, Mg, Al, Zn, Fe, Sn or Ti; hydrogen phosphites of M are water soluble salts.

The preparation method of the present invention is designed on the basis of the following basic reaction:

1) phosphorous acid contains two functional groups and may perform dehydration for self-condensation:

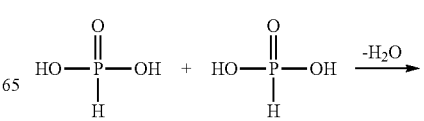

-continued

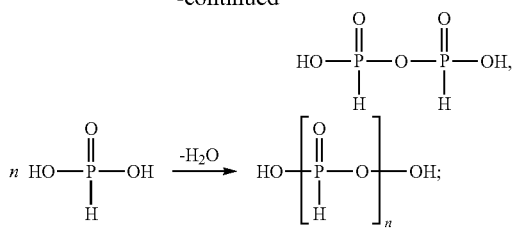

2) phosphorous acid and hydrogen phosphite may perform dehydration reaction

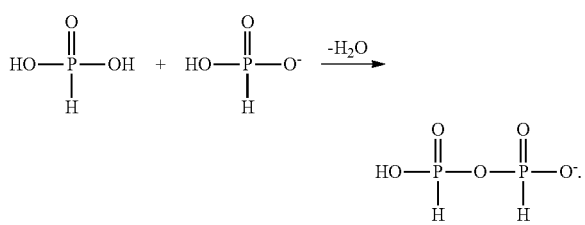

Based on the above reaction mechanism, the inventor designs the following reaction route:

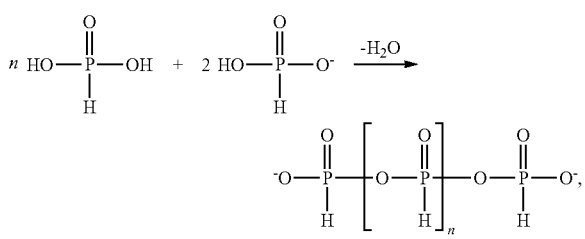

that is, phosphorous acid is reacted with hydrogen phosphite under a certain condition to obtain the condensate of poly/mono-phosphorous acid and aluminum hydrogen phosphite of the present invention.

However, if phosphorous acid and a hydrogen phosphite solid are directly mixed evenly for high temperature dehydration, the obtained products are actually dehydrated products of the two materials instead of dehydrated products between phosphorous acid and the hydrogen phosphite;

each own condensed product has no feature of low water solubility or high phosphorus content, which cannot achieve the objective of the present invention. Therefore, the inventor inventively develops the above preparation method to successfully obtain the condensate of poly/mono-phosphorous acid and aluminum hydrogen phosphite.

The preparation method of the present invention includes: after dissolving phosphorous acid and hydrogen phosphite into water, adding concentrated phosphoric acid for reaction at 80-90° C., then performing drying at low temperature, dehydration reaction at high temperature, washing and drying.

In the step (1), the reaction may produce some intermediates (or bonded bodies) between the reactants, but there is no dehydration reaction and precipitate; and the step is a critical step to perform high temperature dehydration. Preferably, in the step (1), the reaction time is 2-3 h. Preferably, in the step (1), the mass ratio of the reactant to the water is 20%-50%.

In the step (2), the drying may be performed using a drying oven, a drying chamber, a dryer and other common drying equipment in the art.

In the step (3), the inert atmosphere may be rare gas, nitrogen and other atmosphere. Preferably, in the step (3), the dehydration reaction time is 1-10 h.

The solids obtained in the step (3) may contain unreacted phosphites, hydrogen phosphites, by-products and the like; the present invention removes these water soluble components by washing, and controls washing frequency and water consumption by testing the conductivity of washing effluent.

The condensate of poly/mono-phosphorous acid and aluminum hydrogen phosphite obtained in step (4) is preferably crushed to a desired scope of particle size in advance.

The present invention further provides an application of the condensate of poly/mono-phosphorous acid and aluminum hydrogen phosphite as or for the preparation of a flame retardant or a flame retardant synergist.

The flame retardant or the flame retardant synergist may be used for the inflaming retarding of a varnish or a foaming coating, or used for the inflaming retarding of timber or a cellulose-containing product, or used for the preparation of a flame-retardant polymer molding material, a flame-retardant polymer film, and a flame-retardant polymer fiber.

The condensate of poly/mono-phosphorous acid and aluminum hydrogen phosphite may be used for a flame retardant of a varnish or a foaming coating, for a flame retardant of timber and other cellulose-containing products, used as a nonreactive flame retardant for a polymer, used for the preparation of a flame-retardant polymer molding material, used for the preparation of a flame-retardant polymer molding body and/or used for imparting flame retardance to a polyester and pure cellulose fabrics and mixed fabrics through impregnation, and used as a flame retardant mixture and a flame retardant synergist.

In a preferred example, the flame retardant polymer molding material, the flame-retardant polymer film, and the flame-retardant polymer fiber include the following ingredients based on 100% by total mass of the raw materials:

55%-99.9% of polymer matrix,
0.1%-45% of condensate of poly/mono-phosphorous acid and aluminum hydrogen phosphite,
0-44.9% of filler and/or reinforcing material,
and 0-44.9% of other additives.

Preferably, components of the above each raw material have a total mass of 100%.

The filler and/or reinforcing material may be glassfiber (glass fiber).

Preferably, the polymer matrix is nylon or polyester.

In another preferred example, the flame retardant polymer molding material, the flame-retardant polymer film, and the flame-retardant polymer fiber include the following ingredients based on 100% by total mass of the raw materials:

10 55%-99.9% of polymer matrix,
0.1%-45% of flame-retardant system,
0-44.9% of filler and/or reinforcing material, and
0-44.9% of other additives; based on 100% by total mass of the flame-retardant system, the flame-retardant system comprises:

0.1%-50% of condensate of poly/mono-phosphorous acid and aluminum hydrogen phosphite,
and 50%-99.9% of flame retardant.

Preferably, components of the above each raw material have a total mass of 100%.

The filler and/or reinforcing material may be glassfiber (glass fiber).

Preferably, the polymer matrix is at least one of nylon, polyester, and POK (polyketone).

The flame retardant may be dialkyl phosphinic acid and/or salts thereof; condensation products of melamine and/or reaction products of melamine and phosphoric acid and/or reaction products of the condensation products of melamine and polyphosphoric acid or a mixture thereof; nitrogenous phosphates; benzoguanamine, tri(hydroxyethyl) isocyanurate, allantoin, glycoluril, melamine, melamine cyanurate, dicyandiamide and/or guanidine, magnesium oxide, calcium oxide, aluminum oxide, zinc oxide, manganese oxide, stannic oxide, aluminum hydroxide, boehmite, dihydrotalcite, hydrocalumite, magnesium hydroxide, calcium hydroxide, zinc hydroxide, stannic oxide hydrate, manganese hydroxide, zinc borate, alkaline zinc silicate and/or zinc stannate.

The flame retardant may be further melam, melem, melon, dimelamine pyrophosphate, melamine polyphosphate, melam polyphosphate, melon polyphosphate and/or melem polyphosphate and/or a mixed polysalt thereof and/or ammonium hydrogen phosphate, ammonium dihydrogen phosphate and/or ammonium polyphosphate.

The flame retardant may be further a mixture of aluminum hypophosphite, zinc hypophosphite, calcium hypophosphite, sodium phosphite, monophenyl hypophosphorous acid and salts thereof, dialkyl hypophosphorous acid and salts thereof, monoalkyl hypophosphorous acid and salts thereof; adducts on 2-carboxyethyl alkyl hypophosphorous acid and salts thereof, 2-carboxyethyl methyl hypophosphorous acid and salts thereof, 2-carboxyethyl aryl hypophosphorous acid and salts thereof, 2-carboxyethyl phenyl hypophosphorous acid and salts thereof, DOPO and salts thereof, and p-benzoquinone.

Preferably, the condensate of poly/mono-phosphorous acid and aluminum hydrogen phosphite is compounded with diethyl phosphinic aluminum to be applied in glass fiber reinforced engineering plastics, including various kinds of nylon, polyesters and POK base materials.

The compound flame-retardant system of the condensate of poly/mono-phosphorous acid and aluminum hydrogen phosphite needs to be melted at high temperature via a double-screw extruder and mixed for dispersion when the system is applied in glass fiber reinforced engineering plastics.

Compared with the prior art, the present invention has the major advantages: the condensate of poly/mono-phosphorous acid and aluminum hydrogen phosphite has very high thermal decomposition temperature, high phosphorus content, and good flame retardant property, low water absorption and low acidity; moreover, the condensate of poly/mono-phosphorous acid and aluminum hydrogen phosphite can be synergistic with diethyl phosphinic aluminum and may serve as a halogen-free flame retardant component of high polymer materials.

DETAILED DESCRIPTION OF THE EMBODIMENTS

The present invention will be further set forth in combination with the specific embodiments below. It should be understood that these embodiments are only used to illustrate the present invention, but not for the limitation of the scope of the present invention. The operating method not noted with specific condition in the following examples is usually subjected to conventional conditions or the conditions recommended by a manufacturer.

Test items and methods:

1. The prepared compound was subjected to elemental analysis to determine the ratio of each element and obtain a P content:

2. Test on water absorption: 50 g materials were weighed and put in a constant temperature humidity chamber under conditions of 85% humidity at 85° C., kept for 7 d to test the weight increment of the material; and the percentage of the weight increment was, namely, the water absorption of the material;

3. Test on the acidity of the prepared compound: 10 g powdered material was dispersed into 100 g water, and kept for 2 hr at a constant temperature of 25° C. to test a pH value of the solution.

Example 1 Preparation of a Condensate of Mono-Phosphorous acid and Aluminum Hydrogen Phosphite The condensate of mono-phosphorous acid and aluminum hydrogen phosphite has the following structural formula (I):

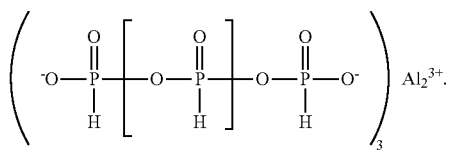

The preparation process was as follows: 82 g (1 mol) phosphorous acid, 540 g (2 mol) aluminum hydrogen phosphite (($H_2PO_3)_3Al$) and 12 g concentrated phosphoric acid ($H_3PO_4$) having a concentration of 85.1 wt % were dissolved into 1500 g water, and fully stirred and mixed evenly for reaction for 3 h at 85° C., then subjected to rotary evaporation at −0.08 MPa and 85° C. until water content was 50 wt %. The materials were transferred to a drying oven and heated up to 130° C., and dried for 120 min; solids had a water content of 0.2 wt %; dried solids were put in a high-temperature vacuum oven, and heated for 3 h at 240° C., and cooled to room temperature and discharged; the materials were washed for separation until washing effluent had a conductivity less than 50 μs/cm, and dried at 130° C. until the water content was 0.08 wt %; then the materials were crushed; the mean grain size D50 was 40 μm, and yield was 97.8%; and the materials were subjected to relevant tests and application.

Table 1 shows an elemental analysis result of the condensate of mono-phosphorous acid and aluminum hydrogen phosphite

TABLE 1

| Element | Ratio (%) |
| --- | --- |
| P | 41.5 |
| Al | 8.0 |
| O | 50.5 |

The content of each element in Table 1 was very close to the theoretical calculating value, indicating that the prepared compound was the condensate of mono-phosphorous acid and aluminum hydrogen phosphite. Water absorption and pH value were shown in Table 3.

Example 2 Preparation of a Condensate of Di-Phosphorous Acid and Aluminum Hydrogen Phosphite The condensate of di-phosphorous acid and aluminum hydrogen phosphite has the following structural formula:

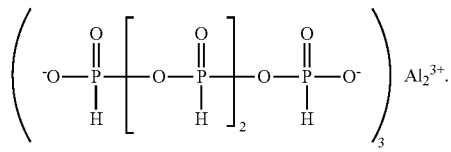

The preparation process was as follows: 164 g (2 mol) phosphorous acid, 540 g (2 mol) aluminum hydrogen phosphite (($H_2PO_3$)$_3$Al) and 14 g concentrated phosphoric acid ($H_3PO_4$) having a concentration of 85.1 wt % were dissolved into 1600 g water, and fully stirred and mixed evenly for reaction for 3 h at 85° C., then subjected to rotary evaporation at −0.08 MPa and 85° C. until water content was 50 wt %. The materials were transferred to a drying oven and heated up to 130° C., and dried for 120 min; solids had a water content of 0.2 wt %; dried solids were put in a high-temperature vacuum oven, and heated for 3 h at 240° C., and cooled to room temperature and discharged; the materials were washed for separation until washing effluent had a conductivity less than 50 μs/cm, and dried at 130° C. until the water content was 0.08 wt %; then the materials were crushed; the mean grain size D50 was 42 μm, and yield was 86.5%; and the materials were subjected relevant tests and application.

Table 2 shows an elemental analysis result of the condensate of di-phosphorous acid and aluminum hydrogen phosphite.

TABLE 2

| Element | Ratio (wt %) |
|---|---|
| P | 43.4 |
| Al | 6.4 |
| O | 50.2 |

The content of each element in Table 2 was very close to the theoretical calculating value, indicating that the prepared compound was the condensate of di-phosphorous acid and aluminum hydrogen phosphite. Water absorption and pH value were shown in Table 3.

Comparative Example 1

The preparation process of the Comparative Example 1 was the same as that in Example 1 except solid reactants were not put in water for reaction, but directly mixed evenly, then put in a high temperature oven for dehydration to obtain materials, then the water absorption and pH value were tested, and results were shown in Table 3.

Comparative Example 2

The preparation process of the Comparative Example 2 was the same as Example 1 except 2 mol aluminum hydrogen phosphite was replaced with 2 mol phosphorous acid to prepare materials, then the water absorption and pH value were tested, and results were shown in Table 3.

Comparative Example 3

The preparation process of the Comparative Example 3 was the same as those in Example 1 except 1 mol phosphorous acid was replaced with 2 mol aluminum hydrogen phosphite to prepare materials, then the water absorption and pH value were tested, and results were shown in Table 3.

TABLE 3

| | P content (wt %) | Water absorption (%) | pH value |
|---|---|---|---|
| Example 1 | 41.5 | 0.09 | 4.3 |
| Example 2 | 43.4 | 0.07 | 4.5 |
| Comparative Example 1 | 38.7 | 0.3 | 2.8 |
| Comparative Example 2 | 43.7 | >10 | <1 |
| Comparative Example 3 | 38.8 | 0.2 | 3.3 |
| Phosphorous acid | 39.2 | >10 | <1 |
| Aluminum hydrogen phosphite | 35.2 | >10 | <1 |
| Aluminum phosphite | 32.0 | 0.5 | 2.6 |

It can be seen from the results of Table 3 that the compound of the present invention has a higher P content, lower water absorption and weaker acidity relative to phosphorous acid, aluminum hydrogen phosphite and aluminum phosphite; and these characteristics have obvious advantages for the compound as a flame retardant. Compared with the preparation process of the comparative examples, the preparation method provided by the present invention can obtain the target compound, indicating the effectiveness of the preparation method. In the preparation process, with the increase of phosphorous acid units; that is, x increases, P content will increase, water adsorption and acidity will decrease, but the yield will decrease; the number of phosphorous acid units is preferably, 1-2, capable of satisfying the application demands.

Application of a Flame Retardant

Example 3

50 wt % nylon 66, 30 wt % glass fiber, 3.8 wt % condensate of mono-phosphorous acid and aluminum hydrogen phosphite in Example 1 and 16.2 wt % diethyl phosphinic aluminum (LFR8003, Jiangsu LiSiDe New Material Co., Ltd.) were prepared into a fire-retardant glass fiber reinforced nylon 66 by conventional regulations, and a sample was prepared to test the flame retardant property, and the flame retardant property of the material was up to UL94 V0 (0.8 mm).

Example 4

52 wt % nylon 66, 30 wt % glass fiber, 3 wt % condensate of di-phosphorous acid and aluminum hydrogen phosphite in Example 2 and 15 wt % diethyl phosphinic aluminum (LFR8003, Jiangsu LiSiDe New Material Co., Ltd.) were prepared into a fire-retardant glass fiber reinforced nylon 66 by conventional regulations, and a sample was prepared to test the flame retardant property, and the flame retardant property of the material was up to UL94 V0 (0.8 mm).

Comparative Example 4

50 wt % nylon 66, 30 wt % glass fiber, and 20 wt % diethyl phosphinic aluminum (LFR8003, Jiangsu LiSiDe New Material Co., Ltd.) were prepared into a fire-retardant glass fiber reinforced nylon 66 by conventional regulations, and a sample was prepared to test the flame retardant property, and the flame retardant property of the material was up to UL94 V2 (0.8 mm). (Based on the flame-retardant grading standard of UL94, the flame retardant efficiency of grade V2 was inferior to that of grade V0).

It can be seen from the application results that the condensate of poly/mono-phosphorous acid and aluminum hydrogen phosphite of the present invention may be synergistic to diethyl phosphinic aluminum to improve the flame retardant efficiency.

Moreover, it should be understood that a person skilled in the art may make various alterations or modifications to the present invention after reading the above description of the present invention, and these equivalent forms should fall within the scope of the claims of the present application.

The invention claimed is:

1. A condensate of poly/mono-phosphorous acid and hydrogen phosphite, characterized in that a structural formula of the condensate of poly/mono-phosphorous acid and hydrogen phosphite is shown as formula (I):

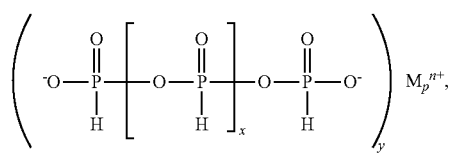

wherein, x is an integer of 1-6; n, y and p are an integer of 1-4; M is Ca, Mg, Al, Zn, Fe, Sn or Ti.

2. The condensate of poly/mono-phosphorous acid and hydrogen phosphite according to claim 1, characterized in that M is Al or Ca, and p is 1 or 2.

3. The condensate of poly/mono-phosphorous acid and hydrogen phosphite according to claim 1, characterized in that the condensate of poly/mono-phosphorous acid and hydrogen phosphite has a particle size of 0.1-1000 μm, a water solubility of 0.01-10 g/L, a bulk density of 80-800 g/L, and a water content not greater than 5 wt %.

4. A preparation method of the condensate of poly/mono-phosphorous acid and hydrogen phosphite according to claim 1, characterized by comprising the following steps:
   (1) dissolving phosphorous acid and a metal M of hydrogen phosphite, as a reactant, into water, then adding concentrated phosphoric acid being 1%- 5% of the mass of the reactant and having a concentration not less than 85 wt %, and performing stirring evenly for reaction at 80-90° C., wherein M is Ca, Mg, Al, Zn, Fe, Sn or Ti;
   (2) drying the material obtained in the step (1) until a water content of the material falls below 0.3 wt %, wherein the drying temperature is controlled to be below 150° C.;
   (3) performing dehydration reaction on the dried product obtained in the step (2) in an inert atmosphere or under vacuum conditions at 200-300° C., and terminating the dehydration reaction when a temperature corresponding to a thermal weight loss of 2 wt % of the product is greater than 400° C., and performing cooling to room temperature and performing discharging to obtain a solid;
   (4) washing the solid obtained in the step (3) with water until washing effluent has a conductivity less than 50 us/cm, drying the washed product until the product has a water content less than 0.3 wt %, thereby obtaining the condensate of poly/mono-phosphorous acid and hydrogen phosphite.

5. The preparation method according to claim 4, characterized in that in the step (1), a mass ratio of the reactant to the water is 20%- 50%; and the reaction time is 2-3 h;
   and in the step (3), the dehydration reaction time is 1-10 h.

6. A method for the preparation of a flame retardant or a flame retardant synergist comprising the step of mixing the condensate of poly/mono-phosphorous acid and hydrogen phosphite according to claim 1 with an additive or applying the condensate of poly/mono-phosphorous acid and hydrogen phosphite to an excipient.

7. The method according to claim 6, characterized in that the flame retardant or the flame retardant synergist is used for the inflaming retarding of a varnish or a foaming coating, or is used for the inflaming retarding of timber or a cellulose-containing product, or is used for the preparation of a flame-retardant polymer molding material, flame-retardant polymer film, or a flame-retardant polymer fiber.

8. The method according to claim 7, characterized in that the flame-retardant polymer molding material, the flame-retardant polymer film, or and the flame-retardant polymer fiber comprise the following ingredients based on 100% by total mass of the raw materials:
   55%- 99.9% of polymer matrix,
   0.1%- 45% of condensate of poly/mono-phosphorous acid and aluminum-hydrogen phosphite,
   0-44.9% of filler and/or reinforcing material,
   and 0-44.9% of other additives.

9. The method according to claim 7, characterized in that the flame-retardant polymer molding material, the flame-retardant polymer film, or and the flame-retardant polymer fiber comprise the following ingredients based on 100% by total mass of the raw materials:
   55%- 99.9% of polymer matrix,
   0.1%- 45% of flame-retardant system,
   0-44.9% of filler and/or reinforcing material, and
   0-44.9% of other additives;
   based on 100% by total mass of the flame-retardant system, the flame-retardant system comprises:
   0.1%- 50% of condensate of poly/mono-phosphorous acid and aluminum hydrogen phosphite,
   and 50%- 99.9% of flame retardant.

10. The method according to claim 8, characterized in that the polymer matrix is at least one of nylon, polyester and POK.

11. The method according to claim 9, wherein the polymer matrix is at least one of nylon, polyester and POK.

* * * * *